United States Patent [19]

Goto et al.

[11] 4,265,652

[45] May 5, 1981

[54] APPARATUS FOR PRODUCING BRAUN TUBES

[75] Inventors: Hajime Goto; Ikuzo Amemiya; Masanobu Nakayama, all of Yokohama, Japan

[73] Assignee: Kabushikikaisha Kanagawa Seisakusho, Tokyo, Japan

[21] Appl. No.: 111,026

[22] Filed: Jan. 10, 1980

[30] Foreign Application Priority Data

Jan. 26, 1979 [JP] Japan ................................ 54/7211

[51] Int. Cl.³ ..................... C03B 23/02; C03B 23/03
[52] U.S. Cl. ...................................... 65/273; 65/106; 65/268; 65/275; 65/305
[58] Field of Search ............... 65/268, 273, 275, 305, 65/106

[56] References Cited

U.S. PATENT DOCUMENTS

| | | | |
|---|---|---|---|
| 2,881,564 | 4/1959 | Olson | 65/305 X |
| 2,931,141 | 4/1960 | Mayhew et al. | 65/305 X |
| 3,607,188 | 9/1971 | Stilley et al. | 65/275 X |
| 3,905,794 | 9/1975 | Revells et al. | 65/275 X |
| 4,047,915 | 9/1977 | Schaffernicht et al. | 65/273 |

*Primary Examiner*—Ronald Serwin
*Attorney, Agent, or Firm*—Holman & Stern

[57] ABSTRACT

An apparatus wherein each glass plate is arranged between a male mold and female mold and is successively intermittently moved through a heating molding chamber and the male mold is depressed and undepressed whenever the glass plate stops in a fixed position in the heating molding chamber to quickly and continuously produce Braun tubes of an accurate shape.

1 Claim, 8 Drawing Figures

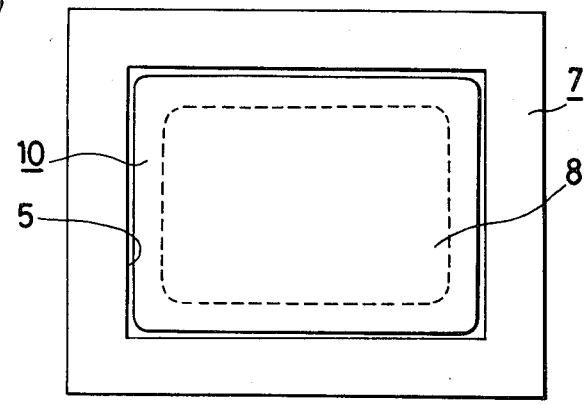
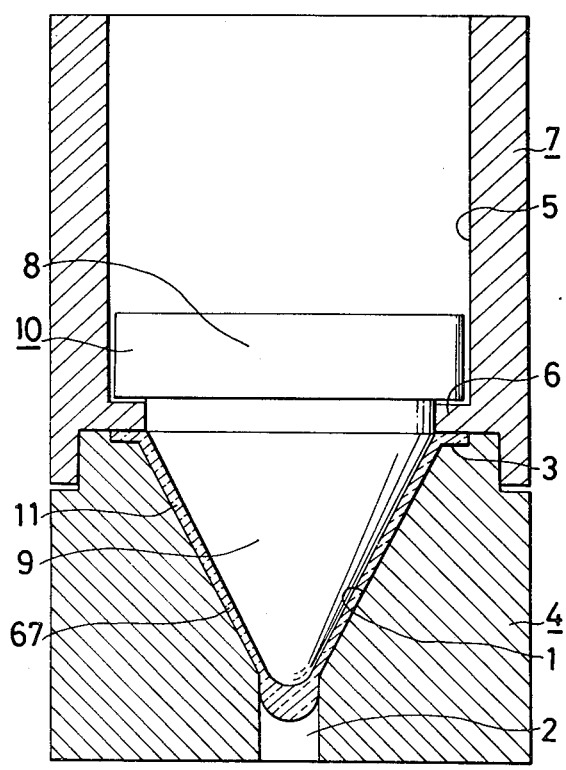

APPARATUS FOR PRODUCING BRAUN TUBES

BACKGROUND OF THE INVENTION (a) Field of the Invention

This invention relates to an apparatus for quickly and continuously producing Braun tubes of an accurate shape by arranging each glass plate between a male mold and female mold, intermittently moving it through a heating molding chamber and depressing and undepressing the male mold whenever it stops in a fixed position in the heating molding chamber.

(b) Description of the Prior Art

In an already known method of producing glass bulbs for Braun tubes in a glass melting furnace, taking out a fixed amount of a molten glass block and putting it into a metal mold to mold it, a highly skilled technique is required, such large related equipments as the melting furnace, taking-out device, metal mold, rotary pressing device and gradually cooling device are required and are made workable by using a precise controlling device and therefore the cost of producing bulbs is high. There is also seen an apparatus wherein, in order to eliminate such defects as are mentioned above, a glass plate is arranged between a male mold and female mold mounted on a rotary endless belt and is slowly passed through a heating chamber and the thus softened glass plate is made to follow the inside surface of the female mold by the self-weight of the male mold so as to be molded. In such method, as the glass plate is molded only by the fall of the male mold due to its self-weight, it is difficult to quickly and smoothly obtain products of a predetermined thickness and accurate shape.

SUMMARY OF THE INVENTION

The present invention is made to eliminate such defects in the conventional producing process of Braun tubes as are mentioned above.

BRIEF DESCRIPTION OF THE DRAWINGS

The drawings show an embodiment of the present invention.

FIG. 7 is a plan view of the same.

FIG. 8 is a vertically sectioned elevation showing the glass plate as molded to be of a required shape with the male mold pressed into the fitting recess of the female mold.

DESCRIPTION OF THE PREFERRED EMBODIMENT

Figure 1:
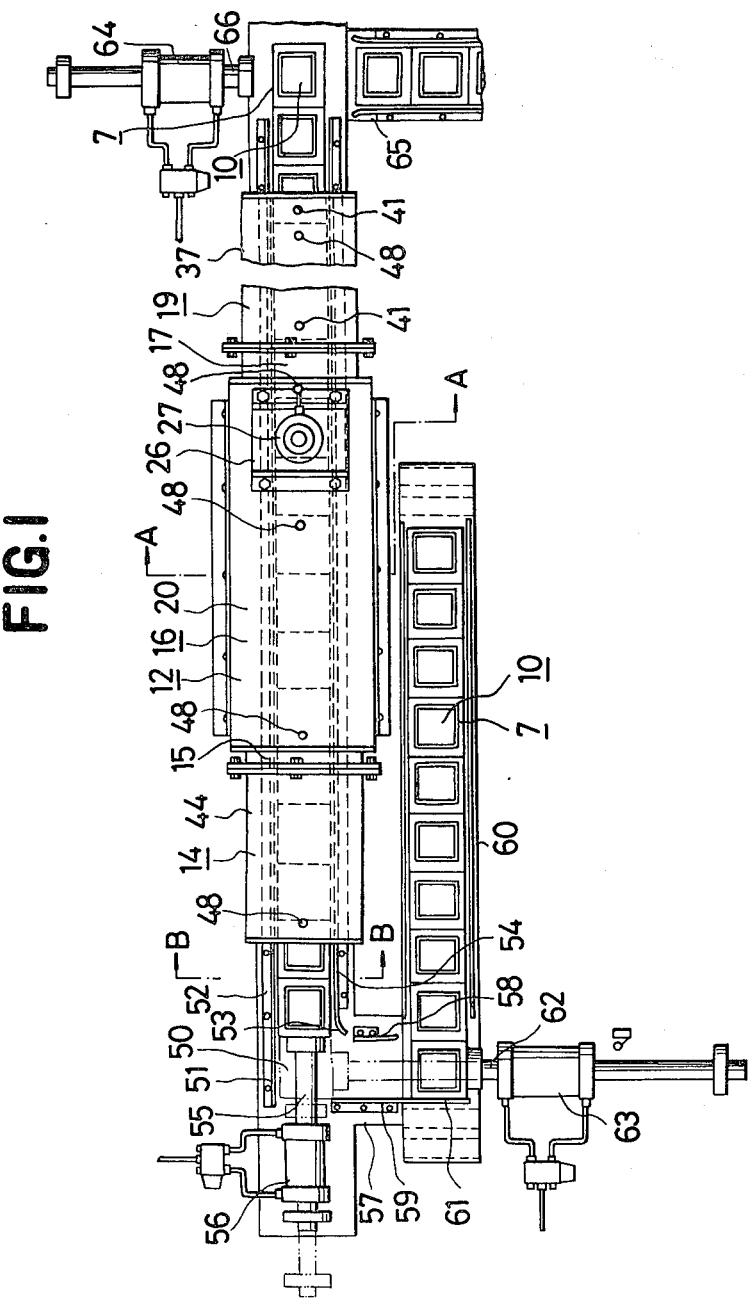
FIG. 1 is a plan view.
Figure 2:
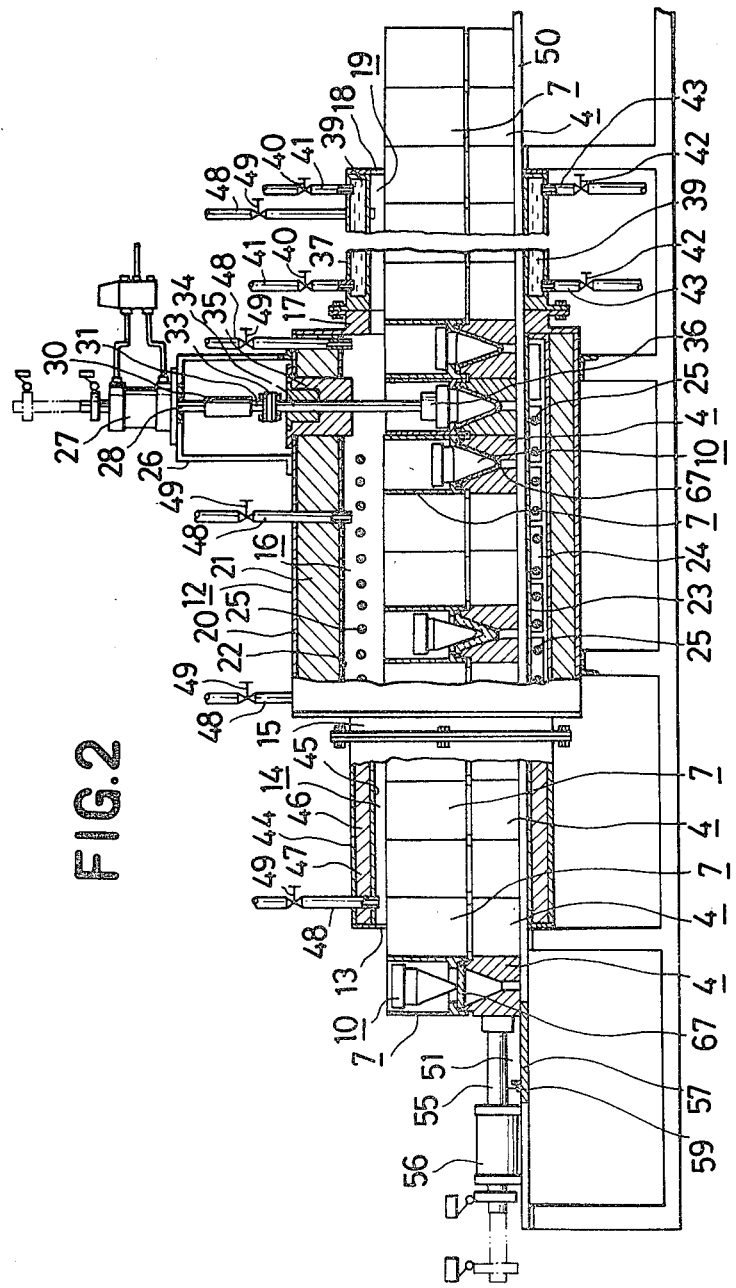
FIG. 2 is a partly sectioned side view.
Figure 3:
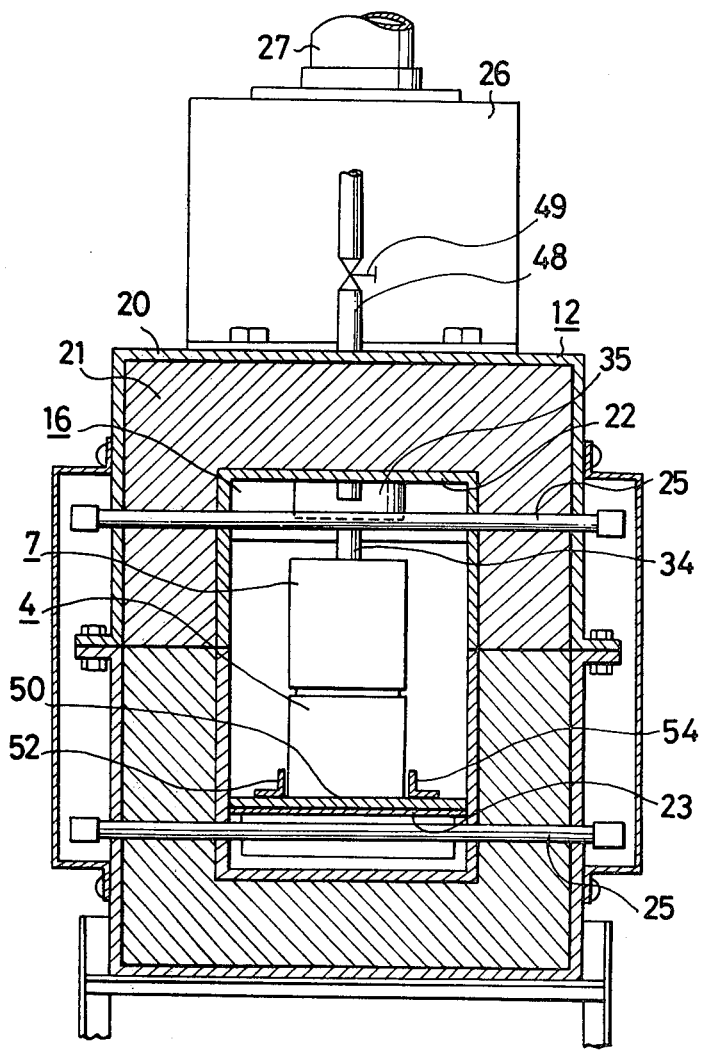
FIG. 3 is a vertically sectioned view on line A—A in FIG. 1.
Figure 4:
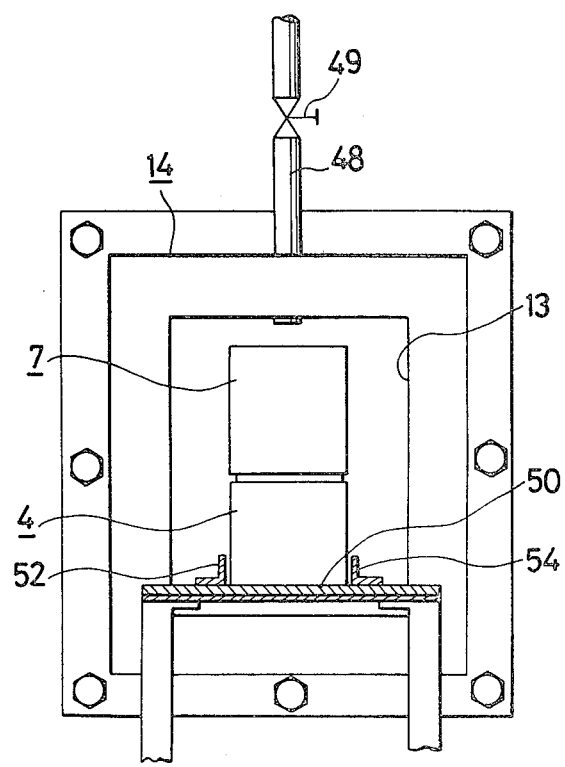
FIG. 4 is a vertically sectioned view on line B—B in FIG. 1.
Figure 5:
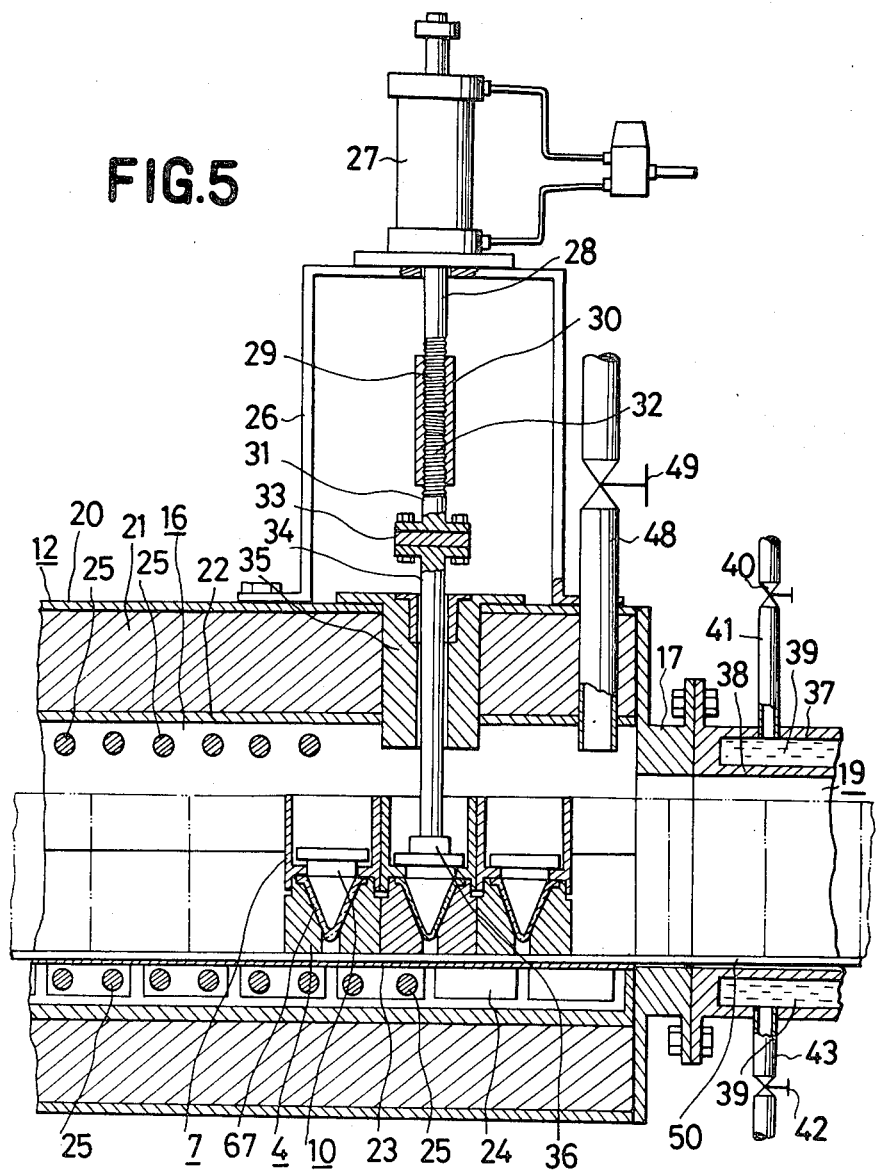
FIG. 5 is a magnified vertically sectioned side view of the front end portion of a heating molding chamber section.
Figure 6:
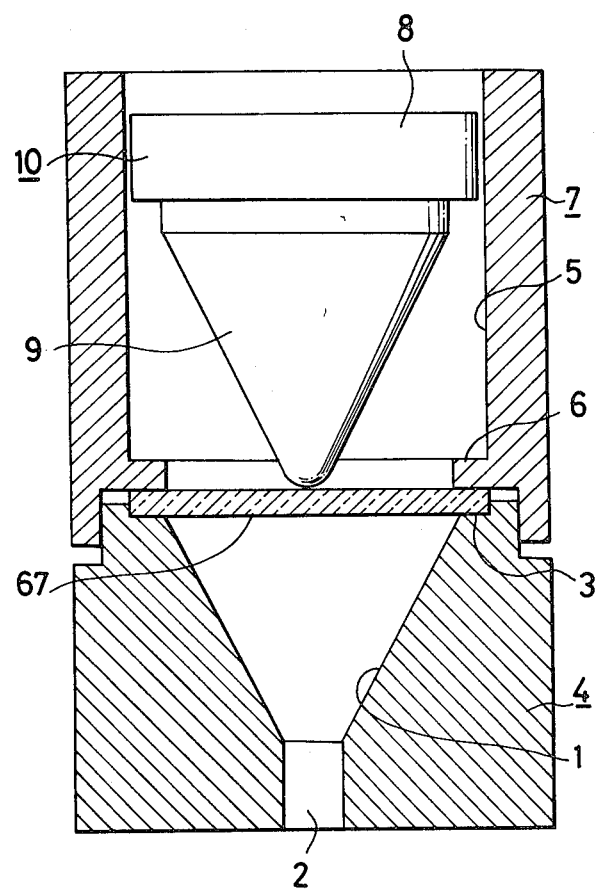
FIG. 6 is a vertically sectioned elevation showing a glass plate as arranged between a male mold fitted in a holder and a female mold to the upper end of which the holder is fitted at the lower end.

An embodiment of the present invention shall be explained in detail with reference to the drawings. A female mold 4 is provided with an upward expanded fitting recess 1 fitted to the contour of a Braun tube body, a through hole 2 having a diameter equal to the outside diameter of a neck tube of a Braun tube and connected to the lower end of said fitting recess 1 and a shallow fitting recess 3 formed on the peripheral edge of the upper edge portion of the above mentioned fitting recess 1 and is made of a carbon material. A holder 7 which is provided with a guide hole 5 of substantially the same size as of the above mentioned fitting recess 3 and a locking and pressing flange 6 positioned on the upper surface of the above mentioned fitting recess 3 on the inner peripheral surface of the bottom portion of said guide hole 5 and is made of a carbon material is removably fitted at the lower end to the upper end of said female mold 4. On the other hand, a guide plate 8 slidably fitted in the guide hole 5 of the above mentioned holder 7 is formed of a carbon material. A male mold 10 having a projection 9 of a shape coinciding with the inner surface of a Braun tube integrally suspended is formed on the lower surface of said guide plate 8.

The guide plate 8 at the upper end of the above mentioned male mold 10 is slidably fitted in the guide hole 5 of the above mentioned holder 7, the male mold 10 is lowered in the guide hole 5, the lower surface of the peripheral edge of the guide plate 8 is made to contact the locking and pressing flange 6 formed to project on the inner peripheral surface of the bottom portion of the guide hole 5 and the bottom surface of the holder 7 is made to contact the upper surface of the female mold 4 so as to form a space forming a predetermined thickness 11 between the inner surface of the fitting recess 1 of the female mold and the outer surface of the projection 9 of the male mold 10 having entered the fitting recess 1.

Further, a heating molding apparatus 12 for passing the female mold 4 and male mold 10 overlapped on each other as mentioned above is formed and is provided with a preheating chamber section 14 provided with an inlet opening 13, a heating molding chamber section 16 connected with said preheating chamber section 14 through a connecting port 15 and a gradually cooling chamber section 19 provided with a delivering opening 18 connected with said heating molding chamber section 16 through a connecting port 17 as arranged in series. The outer housing 20 of the above mentioned heating molding chamber section 16 is lined with a heat-insulator 21 on the inner wall surface. Said heat-insulator 21 is further lined with a heat-proof refractory member 22 on the inner surface. Many SiC (silicon carbide) heat-generators 25 electrically connected to a current source (not illustrated) are arranged in the clearance 24 between the heat-proof refractory member 22 in the lower part and an SiC (silicon carbide) furnace floorboard 23 and in the upper portion of the heating molding chamber section 16 so that the temperature within the heating molding chamber section 16 may be kept as high as 800° to 850° C. by the heat generated by the SiC heat-generators 25. Further, a cylinder fitting frame 26 is secured to the outside upper surface near the front end of the heating molding chamber section 16. A cylinder 27 is vertically fitted to the upper surface of said cylinder fitting frame 26. A piston rod 28 of said cylinder 27 is present in the cylinder fitting frame 26 so as to be free to advance and retreat and is provided with a normal male screw 29 in the lower portion.

An adjusting screw cylinder 30 is screwed in the upper portion with the normal male screw 29 in the lower portion of the above mentioned piston rod 28. A reverse male screw 32 in the upper portion of an adjusting rod 31 is screwed with the lower portion of said adjusting screw cylinder 30. A pressing shaft 34 made of a heat-proof metal material is integrally connected at the upper end to the lower end of said adjusting rod 31 through a heat-insulator 33 so that the pressing shaft 34 may be freely positioned and adjusted vertically by properly normally and reversely rotating the adjusting screw cylinder 30.

The above mentioned pressing shaft 34 is vertically slidably inserted through a guide bush 35 made of a heat-proof metal material and fitted through the outer housing 20, heat-insulator 21 and heat-proof refractory member 22 near the front end on the heating molding chamber section 16. A pressing disk 36 formed at the lower end of said pressing shaft 34 is present in the heating molding chamber section 16 so as to be free to move up and down.

The gradually cooling chamber section 19 connected to the above mentioned heating molding chamber section 16 through the connecting port 17 has on the peripheral surface a water chamber 39 formed of an outer housing 37 and inner housing 38. A plurality of water feeding pipes 41 having respective opening and closing cocks 40 connected to a water pipe (not illustrated) are connected to the upper portion of said water chamber 39. A draining pipe 43 provided with an opening and closing valve 42 is connected to the lower portion of the water chamber 39. Water is made to properly flow through the water chamber 39 by opening and closing the cocks 40 and valve 42.

Further, the preheating chamber section 14 connected to the above mentioned heating molding chamber section 16 through the connecting port 15 has on the peripheral surface a heat-insulating chamber 46 formed of an outer housing 44 and inner housing 45 filled with a heat-insulator 47. Branch pipes 48 branched from a nitrogen feeding pipe (not illustrated) are connected through respective opening and closing cocks 49 respectively to the upper portion near the inlet opening 13 of the preheating chamber section 14, the upper portions at both ends and in the intermediate position of the above mentioned heating molding chamber 16 and the upper portion near the delivering opening 18 of the gradually cooling chamber section 19 so that a series of the preheating chamber section 14, heating molding chamber section 16 and gradually cooling chamber section 19 forming the heating molding apparatus 12 may be filled with nitrogen by opening the opening and closing cocks 49. A conveying base plate 50 made of a heat-proof member and contacting on the lower surface with the SiC furnace floorboard 23 of the above mentioned heating molding chamber section 16, the inside bottom portion of the preheating chamber section 14 and the inside bottom portion of the gradually cooling chamber section 19 is fitted through the heating molding apparatus 12 and is provided on it with a guide rail piece 52 formed by extending a butting portion 51 and a guide rail piece 54 made shorter by the length of the above mentioned butting portion 51 and having an inlet curved portion 53 formed at the end with a distance equal to the width of the above mentioned female mold between them. A conveying cylinder 56 having a piston rod 55 positioned in the middle between the above mentioned guide rail pieces 52 and 54 is fitted to the rear end of the conveying base plate 50 so that the female molds 4 having the respective male molds 10 overlapped on them and arranged in turn on the conveying base plate 50 may be successively moved one by one by the distance for one along the guide rail pieces 52 and 54 by the extending and contracting operation of the piston rod 55 of the conveying cylinder 56.

A connecting plate 57 is provided at right angles with the conveying base plate 50 in the above mentioned rear end side portion and is provided on it with a guide rail piece 58 adjacent at one end to one end of the inlet curved portion 53 of the guide rail piece 54 of the conveying base plate 50 and a regulating rail piece 52 with a distance equal to the width of the above mentioned female mold between it and said guide rail piece 58. A feeding conveyer 60 arranged parallelly with the conveying base plate 50 is positioned at one end at the end of the connecting plate 57. An extension 61 of the above mentioned regulating rail piece 59 is positioned at one end of said feeding conveyer 60. A delivering cylinder 63 for advancing and retreating a piston rod toward and from the middle between the above mentioned guide rail piece 58 and regulating rail piece 59 is arranged on the side of one end of the feeding conveyer 60 so that the female mold 4 having the male mold 4 overlapped on it, mounted on the feeding conveyer 60 and contacting the extension 61 of the regulating rail piece 59 may be pushed out onto the rear end portion of the conveying base plate 50 through between the regulating rail piece 59 and guide rail piece 58 of the connecting plate 57 by the piston rod 62 of the delivering cylinder 63 and may be made to contact on one side with the butting portion 51 of the guide rail piece 52 of the conveying base plate 50.

At the same time as the female mold having the male mold 10 overlapped on it is pushed out onto the conveying base plate 50 as mentioned above, the piston rod 55 of the conveying cylinder 56 at the rear end of the conveying base plate is operated to extend and contract to move the overlapped body of the above mentioned male mold 10 and female mold 4 by a distance equal to the length of one body on the conveying base plate 50 along the guide rail pieces 52 and 54. Thus the overlapped bodies of the male molds 10 and female molds 4 as arranged in a line on the conveying base plate 50 are passed through the heating molding apparatus 12 while being intermittently advanced and moved by the stroke of one female mold 4 at one time and are stopped just below the cylinder 27 of the heating molding apparatus 12. When they thus stop, the piston rod 28 of the cylinder 27 is operated to extend and contract so that the pressing disk 36 at the lower end of the pressing shaft connected to said piston rod 28 by adjusting the vertical position may be advanced and retreated into and from the guide hole 5 of the holder 7 in which the male mold 10 is fitted and the guide plate 8 of the male mold 10 may be depressed and undepressed with the above mentioned pressing disk 36. The overlapped body of the male mold 10 and female mold 4 having completed the depressing operation to the male mold 10 is further successively advanced into the gradually cooling chamber section 19.

A projecting cylinder 64 is arranged at right angles with the conveying base plate 50 on one side of the front end of the above mentioned conveying base plate 50 and a distributing base plate 65 is provided on the other side of the front end of the conveying base plate 50 so as to be opposed to the projecting cylinder 64 so that the overlapped body of the male mold 10 and female mold 14 successively intermittently conveyed outward from the gradually cooling chamber section 19 may be projected and moved onto the distributing base plate 65 on the side by the piston rod 66 of the projecting cylinder 64 from the front end of the conveying base plate 50.

Now the operation of the present invention shall be explained. A female mold 4 is provided with a fitting recess 1 fitted to the contour of a Braun tube body, a through hole 2 connected to the lower end of said fitting recess 1 and a fitting recess 3 formed on the peripheral edge of the upper edge portion of the above mentioned recess 1 and is formed of a carbon material. A holder 7 which is provided with a guide hole 5 of substantially the same size as of the above mentioned fitting recess 3 and a locking and pressing flange 6 positioned on the upper surface of the above mentioned fitting recess 3 on the inner peripheral surface of the bottom portion of said guide hole 5 and is made of a carbon material is removably fitted at the lower end to the upper end of said female mold 4. A male mold 10 which has a projection 9 coinciding with the inner surface of a Braun tube integrally suspended on the lower surface of a guide plate 8 and is made of a carbon material is slidably fitted in the guide hole 5 of said holder 7. On the other hand, a heating molding apparatus 12 is provided with a preheating chamber section 14, a heating molding chamber section 16 and a gradually cooling chamber section 19 as arranged successively in series and is so formed as to be of a nitrogen atmosphere within it. A cylinder 27 is vertically provided on the outside near the front end of the heating molding chamber section 16. A pressing shaft 34 made of a heat-proof metal material is connected adjustably in the position to a piston rod 28 of said cylinder 27 through a heat-insulator 33 and is slidably inserted through a guide bush 35 made of a heat-proof metal material and passed through the upper portion near the front end of the heating molding chamber section 16 so that a pressing disk 36 formed at the lower end of said pressing shaft 34 may be present in the heating molding chamber section 16 so as to be free to move up and down. Each overlapped body of the above mentioned female mold 4 and the male mold 10 slidably fitted in the holder 7 fitted at the lower end to the upper end of the female mold 4 is mounted on a conveying base plate 50 provided through the above mentioned heating molding apparatus 12 and is successively intermittently moved by the stroke of one body toward the heating molding chamber section 16 from the side of the preheating chamber section 4 of the heating molding apparatus 12. Whenever the intermittently moved overlapped body stops just below the cylinder 27 of the heating molding chamber section 16, the cylinder 27 is operated to extend and contract so that the guide plate 8 of the male mold 10 of the overlapped body may be depressed and undepressed by a pressing disk 36 at the lower end of the pressing shaft 34 connected to the piston rod 28 of said cylinder 27. Therefore, when, as shown in FIG. 7, a glass plate 67 of a predetermined thickness is fitted in the fitting recess 3 on the upper edge of the fitting recess 1 of the female mold 4, the holder 7 is fitted at the lower end to the upper end of the female mold 4, the glass plate 67 is pressed on the peripheral edge with the locking and pressing flange 6 in the lower portion of the guide hole 5 of the holder 7 and many overlapped bodies in each of which the projection 9 of the male mold 10 having the guide plate 8 fitted in the guide hole 5 of the holder 7 is made to contact at the lower end with the glass plate 67 are prepared, are mounted on the feeding conveyer 60 as shown in the embodiment of the present invention, are delivered onto the rear end portion of the conveying base plate 50 with the piston rod 62 of the delivering cylinder 63 from one end of the feeding conveyer 60 and are successively intermittently moved toward the heating molding apparatus 12 by the stroke of one of the above mentioned overlapped bodies by the extending and contracting operation of the piston rod 55 of the conveying cylinder 56 at the end of the conveying base plate, the glass plate 67 will be heated to a higher temperature while being successively intermittently moved from the preheating chamber section 14 in a nitrogen atmosphere to the heating molding chamber section 16, will be softened at a high temperature of 800° to 850° C. in the heating molding chamber section 16 and, as softened and free to expand, will be expanded into the fitting recess 1 of the female mold 4 by the self-weight of the male mold 4.

At the same time as the glass plate expanded into the fitting recess 1 of the female mold 4 by the self-weight of the male mold stops just below the cylinder 27, the piston rod 28 of the cylinder 27 will operate to extend and contract so that the guide plate 8 of the male mold 10 may be depressed under a predetermined pressure and undepressed by the pressing disk 36 at the lower end of the pressing shaft 34 connected adjustably in the position to said piston rod 28. Thus, as shown in FIG. 9, the projection 9 of the male mold 10 will be pressed accurately into the fitting recess 1 of the female mold 4 to mold the glass plate to be of a predetermined thickness. Then the overlapped body having had the depression of the male mold 10 released will be cooled while being further successively intermittently moved through the gradually cooling chamber section 19, will come out of the gradually cooling chamber section 19, will be delivered onto the distributing base plate 65 through such proper device as, for example, the projecting cylinder 64 from the front end of the conveying base plate 50 and will be distributed to a separate department (not illustrated), the holder 7 and male mold 10 will be separated from the female mold 4 and a glass product molded to be a body of a Braun tube will be able to be taken out.

In short, in the present invention, an overlapped body in which a holder 7 is removably fitted at the lower end to the upper end of a female mold 4 provided with a fitting recess 1 and a male mold 10 is fitted in said holder 7 so as to be free to slide up and down to arrange a glass plate 67 between the above mentioned female mold 4 and male mold 10 is formed of a carbon material, on the other hand, a heating molding apparatus in which a nitrogen atmosphere is made is formed, a cylinder 27 is vertically provided on the upper outside near the front end of the heating molding chamber section 16 of said heating molding apparatus 12, a pressing shaft 34 made of a heat-proof metal material is connected so as to be adjustable in the position through a heat-insulator 33 to a piston rod 28 of said cylinder 27 and is slidably inserted through a guide bush 35 made of a heat-proof metal material and provided through the upper portion near the front end of the heating molding chamber section 16, a conveying base plate 50 is provided through the heating molding apparatus 12, each overlapped body of the above mentioned female mold 4 and male mold 10 with a glass plate arranged between them is mounted on said conveying base plate 50 and is successively intermittently moved by the stroke of one overlapped body and, whenever the intermittently moved overlapped body stops just below the cylinder 27, the piston rod 28 of the cylinder 27 operates to extend and contract so as to depress and undepress the male mold 10 with the lower end of the pressing shaft 34. Therefore, the glass plate 67 heated to a high temperature to be softened in the heating molding chamber section 16 will be pressed well into the female mold 4 with the male mold 10 and thus Braun tube glass bodies of any desired products of a fixed thickness and varied thickness can be molded quickly, accurately and efficiently without making faulty products.

We claim:

1. An apparatus for producing Braun tubes characterized in that a holder is removably fitted at the lower end to the upper end of a female mold provided with a fitting recess, a male mold is vertically slidably arranged in said holder, each overlapped body with a glass plate arranged between the above mentioned female mold and male mold is formed, a cylinder is vertically provided above a heating molding chamber section of a heating molding apparatus, the lower end of a pressing shaft connected to a piston rod of said cylinder is present so as to be free to move up and down in the heating molding chamber section, a conveying base plate is provided through the heating molding apparatus, each overlapped body of the female mold and male mold with the above mentioned glass plate arranged between them is mounted on said conveying base plate and is successively intermittently moved and, whenever the intermittently moved overlapped body stops just below the cylinder of the heating chamber section, the cylinder is operated to depress and undepress the male mold with the lower end of the pressing shaft.

* * * * *